United States Patent [19]
Hofmann

[11] 4,048,655
[45] Sept. 13, 1977

[54] VARIABLE SPEED HORIZONTAL AUTOMATIC PHASE CONTROL

[75] Inventor: Judson A. Hofmann, Schaumburg, Ill.

[73] Assignee: Zenith Radio Corporation, Glenview, Ill.

[21] Appl. No.: 646,721

[22] Filed: Jan. 5, 1976

[51] Int. Cl.² .............................................. H04N 5/04
[52] U.S. Cl. ................................................ 358/148
[58] Field of Search .................... 178/7.5 R, DIG. 34, 178/69.5 TV; 358/148, 158

[56] References Cited
U.S. PATENT DOCUMENTS

| 3,740,473 | 6/1973 | Von Der Ohe | 178/7.5 R |
| 3,752,916 | 8/1973 | Lowry et al. | 178/7.5 R X |
| 3,980,819 | 9/1976 | Schwartz | 178/7.5 R |

Primary Examiner—Richard Murray
Assistant Examiner—Mitchell Saffian
Attorney, Agent, or Firm—Roy A. Ekstrand

[57] ABSTRACT

A television receiver includes conventional circuitry for receiving processing and detecting an information bearing signal. Vertical scansion means respond to recovered synchronizing information and provide vertical scansion of a conventional cathode ray tube. A horizontal oscillator coupled to an output amplifier and high voltage generator generates a scansion signal and provides horizontal scansion of the cathode ray tube. An automatic phase control loop (APC) includes a differential amplifier phase detector which responds to the reference sync pulses and the horizontal output signal to produce an error voltage which is stored in a hold capacitor. A speed control amplifier coupled to the receiver AGC system varies the amount of phase detector action directly with signal strength to vary system speed.

6 Claims, 3 Drawing Figures

VARIABLE SPEED HORIZONTAL AUTOMATIC PHASE CONTROL

BACKGROUND OF THE INVENTION

This invention relates generally to television receivers and particularly to the horizontal scansion systems thereof.

In the typical television receiver, a transmitted signal bearing information components of picture, sound and deflection synchronization information is received by an antenna and processed by a tuner and intermediate frequency amplifier to a level sufficient to permit recovery of the modulated components. The latter take the form of a combined train of pulses at vertical and horizontal scansion frequencies. A cathode ray tube (CRT) display device is caused to be simultaneously scanned in the vertical and horizontal directions by individual vertical and horizontal scansion systems within the receiver.

In both the horizontal and vertical systems a local oscillator generates a scansion signal which is increased by appropriate power amplifying circuitry to a level sufficient to drive electromagnetic yoke windings situated on the CRT. Proper display of the picture components within the signal requires that both the vertical and horizontal scansions be appropriately synchronized in frequency and phase to the incoming signal information. In the vertical deflection or scansion system (operative at approximately 60 hertz), the vertical scansion synchronization pulses are usually applied directly to the vertical oscillator triggering it and causing it to operate at the desired frequency and phase.

While this method of synchronization has proven satisfactory for the vertical scan system, the higher frequency (approximately 15 kHz), horizontal scansion system is generally synchronized in a different manner. In most horizontal scan systems a local automatic phase control loop is operative upon the oscillator. Such systems generally include a phase detector or multiplier which responds to the reference synchronization pulses and a feedback sample of horizontal output signal. The most common practice is to actually sample the horizontal retrace signal rather than the oscillator signal directly. The retrace signal is derived by the horizontal amplifier in cooperation with the horizontal output transformer and is a delayed-in-time signal at the same frequency as the oscillator output. The phase detector compares the reference and output signals and generate an error signal representing the deviation of the oscillator frequency and phase. The error signal is coupled to a low pass filter which minimizes the effects of signal noise and, in part, determines the response speed of the APC loop. The filtered error signal is coupled back to a voltage control point within the horizontal oscillator completing the loop and affecting frequency and phase control.

Automatic phase control systems operative upon the horizontal oscillator, are well known in the industry. However, while there use has proven generally satisfactory under mose operating conditions several often serious shortcomings do arise. For example, when a weak signal is received, the recovered synchronizing components include a great deal of noise. This results from the disproportionate amplification of thermal noise within the receiver's tuner and intermediate frequency amplifier when compensatory increases in system gain are made in response to lower signal levels. Under such conditions, APC system bandwidth results in jitter which appear as erratic back and forth shifting of portions of the displayed picture. It is desirable, therefore, that APC system bandwidth be narrow enough to eliminate or at least minimize such effects of noise components on the oscillator. However, narrowing the filter bandwidth increases the response time of the automatic phase control loop making it prohibitively slow. As a result the APC system often cannot respond quickly enough to correct rapid phase displacement which often occurs during the reception of video player signals.

In contrast, during strong signal reception the tuner and IF amplifier gain is reduced and the recovered signal components have lower noise content. With reduced noise in the signal, a wide APC filter bandwidth and a fast system response time are desired enabling it to compensate for problems of jitter and rapid phase displacements. The demands upon the APC system under differing signal conditions are conflicting and experience has shown they cannot be reconciled by selection of the filter time constant. As a result, most receivers are designed to compromise these conflicting system requirements.

The recent introduction of video players as a consumer item has further complicated the situation. It is not uncommon for video players, in particular the lower cost types most available to the consumer, to produce problems of jitter and abrupt phase displacements in the recovered horizontal synchronization information. This is generally due to the production of an abrupt phase displacement occurring during the vertical retrace interval, that is, between successive vertical scans. After a complete top-to-bottom scansion the CRT is retraced or indexed back to the top of the viewing screen. The difficulty generally arises due to the inability of the video player to maintain the phase of early horizontal synchronization pulses to those which last existed at the end of the previous vertical scan. As a result the horizontal scansion displayed at the top of the CRT is displaced or phase shifted.

Since the APC systems of most receivers represent a compromised speed of response to achieve adequate noise immunity they are unable to quickly compensate for such errors and require several horizontal scan lines to correct oscillator phase. The resulting condition manifests itself as a "hooking" or curving of vertical line picture elements in the upper portion of the displayed image.

The difficulty of resolving the conflicting performance requirements between broadcast and video player reception have prompted some television manufacturers to provide a switch which alternatively configures the receiver for either video player or broadcast signal reception by altering the bandwidth of the APC filter.

While such configurable APC filters provide some improvement in problems peculiar to video player operation, they do not solve the basic problem of conflicting APC system requirements, that is, the desire to have broad filter bandwidth high speed loop operation under some signal conditions and narrow bandwidth slow speed operation under other signal conditions.

OBJECTS OF THE INVENTION

It is an object of the present invention to provide an improved horizontal APC system for a television receiver.

It is a more particular object of the present invention to provide a horizontal APC system for a television receiver which offers the benefits of wide and narrow APC filter bandwidths.

SUMMARY OF THE INVENTION

A television receiver includes signal means recovering components of picture, audio and scansion synchronizing information modulated on a received signal and display means having a scannable viewing screen for reproducing the picture information. Low frequency scanning means provide scansion of the viewing screen in a first direction while low frequency synchronizing means maintain synchronism between the scansion synchronizing information and low frequency scansion. High frequency scanning means provide scansion of the viewing screen in a second direction while high frequency synchronizing means maintain synchronism between the scansion synchronizing information and the high frequency scansion. The system response speed of the high frequency synchronizing means are varied in a direct relationship to the amplitude of signals received.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
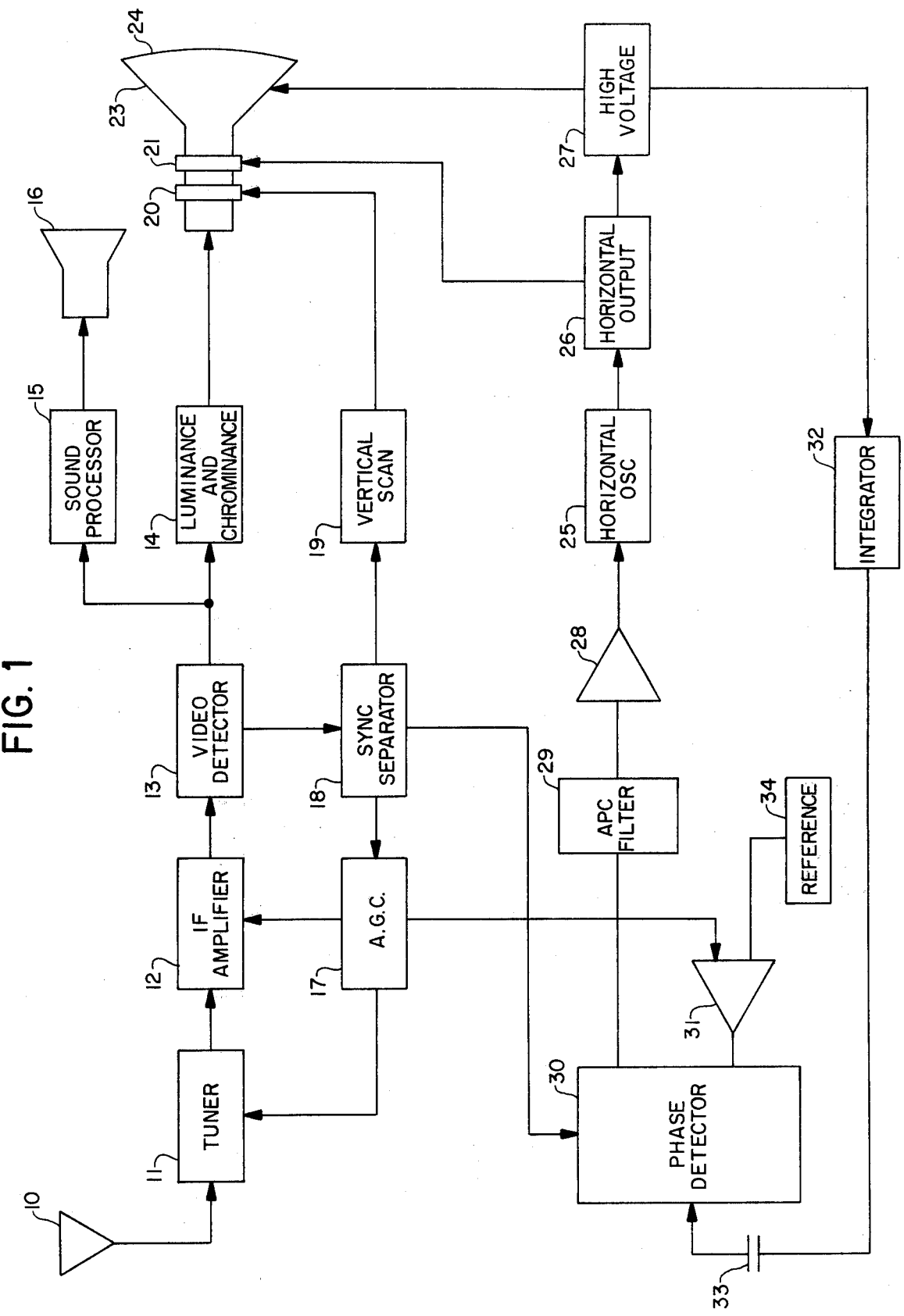
FIG. 1 is a block diagram of a television receiver constructed in accordance with the present invention.

FIG. 1 shows a block diagram representation of a television receiver constructed in accordance with the present invention. A tuner 11 receives an information bearing signal incident upon antenna 10 which is converted to an intermediate frequency signal and coupled to an intermediate frequency amplifier 12 which in turn amplifies the signal to a level sufficient to drive a video detector 13. The modulation components of picture, sound and deflection synchronization information are recovered from the intermediate frequency signal by detector 13 and are applied to a luminance and chrominance processor 14 which in turn drives the control electrodes (not shown) of a conventional CRT 23.

The output of video detector 13 is also applied to a sound processor 15, which in turn drives a speaker 16, and a sync separator 18 which recovers the horizontal and vertical scan synchronization (sync) pulses. The former are applied to a vertical scan system 19 which provides a vertical scansion signal driving a vertical deflection yoke 20 situated on CRT 23. Sync separator 18 and horizontal output 26 are coupled to an AGC control voltage generator 17 which by conventional amplitude comparison techniques produces a control voltage which is fed back to amplifier 12 and tuner 11 providing a constant output signal level at detector 13.

A horizontal oscillator 25 generates a horizontal rate scansion signal which is coupled to a horizontal output amplifier 26 raising the scan signal to a sufficient level to drive a horizontal deflection yoke 21 situated on CRT 23. The output of horizontal amplifier 26 is also coupled to a high voltage generator 27 which produces an accelerating voltage for CRT 23. A sample of the high-amplitude short-duration horizontal scansion retrace pulse is coupled from high voltage generator 27 to the input of an integrator 32 which converts it to a sawtooth waveform. The resulting sawtooth waveform is coupled by a series capacitor 33 to one input of a phase detector 30. The horizontal synchronizing pulses produced by sync separator 18 are coupled to the other input of phase detector 30.

Detector 30 performs a frequency and phase comparison of the input saw waveform and reference sync pulse and produces (by techniques later described) an error voltage which is applied to a low pass filter 29. The output of low pass filter 29 is coupled via a buffer amplifier 28 to a control voltage point within horizontal oscillator 25. A speed control amplifier 31 has inputs coupled to AGC 17, a source of reference voltage 34 and an output connected to phase detector 30. With the exception of buffer amplifier 28, low pass filter 29, phase detector 30 and speed control amplifier 31, the operation of the receiver shown in FIG. 1 is conventional.

The operation of speed control amplifier 31 varies the characteristics of the horizontal APC loop as a function of signal strength. Under strong signal conditions, such as would typically exist when the receiver is driven by a video player or tape recorder, the output voltage from AGC 17 reduces the gains tuner 11 and IF amplifier 12. The signal-to-noise ratio of the output signal at detector 13 is extremely good under such circumstance, that is, very little nosie is present in the recovered sync pulses to disturb the synchronization circuitry.

In addition to gain reduction, under strong signal conditions the AGC voltage causes speed control amplifier 31 to increase in the amount of control voltage change produced by phase detector 30 for any given phase difference between the oscillator output signal and the reference synchronization pulse. In other words, the system speed is caused to increase, that is, to react more quickly to correct phase errors existing between the oscillator and the reference sync pulse.

This result is desirable under strong signal conditions since large system responses may, for example, be necessitated by the above-described operational discrepancies of the video players. Because the strong signal condition is inherently one of low noise, the APC system may be operated with a high speed of response without fear of deleterious effects on error voltage or correction due to the presence of noise.

Under weak signal conditions, the incoming signal and recovered sync pulses are likely to be burdened with noise energy which may produce erroneous and deleterious effects upon a high speed APC system. However, under weak signal conditions the output voltage from AGC system 17 causes speed control amplifier 31 to reduce the system speed of response by reducing the control voltage change produced for any given phase or frequency difference between the reference sync pulses and the horizontal oscillator output signal. With the system speed reduced, the effect of noise energy in the signal is substantially reduced and the deleterious effects otherwise realized by the presence of noise within the system are avoided.

Figure 2:
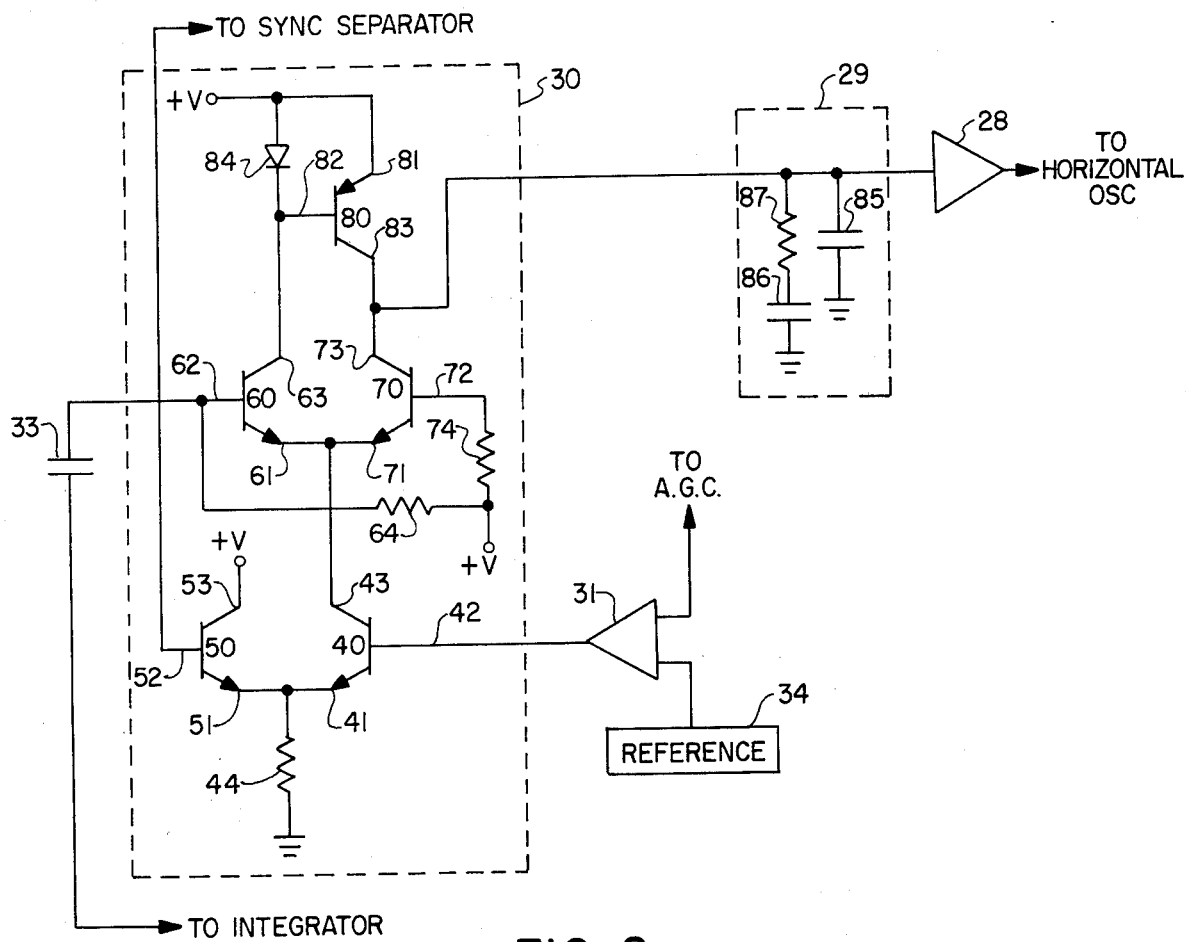
FIG. 2 is a schematic detail of a portion of the receiver shown in FIG. 1.

FIG. 2 shows phase detector 30 and APC filter 29 in schematic detail. A differential amplifier is formed by a transistor 60 having an emitter 61, a base 62 connected to capacitor 33, and a collector 63 connected to a source of positive potential V by a diode 84 in combination with a transistor 70 having an emitter 71 connected to emitter 61, a base 72 connected to a source of positive potential V by a resistor 74, and a collector 73 connected to a hold capacitor 85 within low pass filter 29. A resistor 64 couples base 62 to a source of positive potential V.

A second differential amplifier is formed by a transistor 40 having an emitter 41 connected to ground by a resistor 44, a base 42 connected to the output of speed control amplifier 31, and a collector 43 connected to the junction of emitters 61 and 71 in combination with a transistor 50 having an emitter 51 connected to emitter 41, a base 52 connected to sync separator 18, and a collector 53 connected to a source of positive potential V. A series combination of a resistor 87 and a capacitor 86 are connected in parallel with hold capacitor 85 to complete low pass filter 29.

Figure 3:
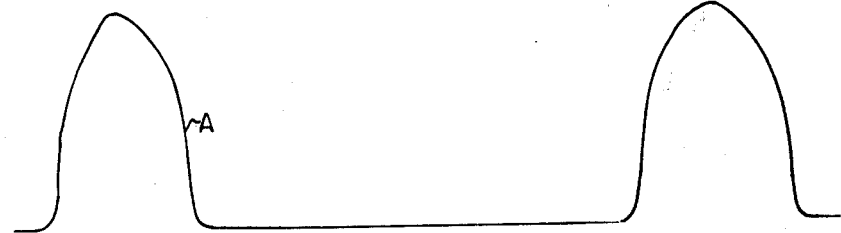
FIG. 3 shows a group of signal waveforms.
Figure 3:
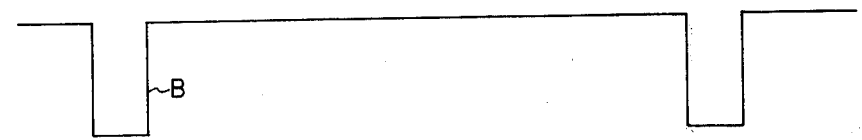
Figure 3:
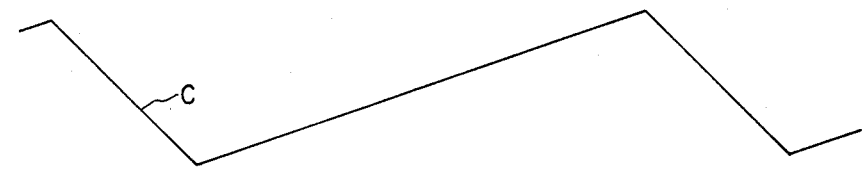

The operation of phase detector 30 as well as low pass filter 29 within the horizontal APC loop is best understood by simultaneous reference to FIGS. 2 and 3. In FIG. 3, curve A represents the horizontal retrace signal coupled to integrator 32 comprising a sample of the output signal generated by horizontal oscillator 25. Waveform C depicts the output of integrator 32 comprising a sawtooth waveform resulting from integration of waveform A which is AC coupled through capacitor 33 to base 62 of transistor 60 forming the sample input to the phase detector. Waveform B depicts the reference horizontal synchronizing pulses. The phse relationship shown is that of an in-phase condition characterized by coincidence between the reference sync pulse and the center of the negative slope portion of sawtooth waveform C.

In operation during "in-sync" conditions, that is, synchronization between received signal and scansion, a negative-going sync pulse at base 52 causes normally conductive transistor 50 to turn off decreasing the voltage developed across resistor 44. The reduction in voltage across resistor 44 causes the voltage at emitter 41 to drop which in turn causes transistor 40 to be turned on. The collector current of transistor 40 is determined by the voltage applied to base 42 by speed control amplifier 31 (the importance of this will be discussed below).

Transistor 40 forms a gated current sink for differential transistor pair 60 and 70 and its conduction in response to sync pulses causes simultaneous conduction by transistors 60 and 70. The ratio of collector currents in transistors 60 and 70 during this interval is determined by the relative voltages at bases 62 and 72. The latter is maintained at a constant voltage by resistor 74 and source +V which acts as a signal (or AC) ground. As a result the voltage at base 62 determines the relative currents in transistors 60 and 70. If the sawtooth waveform is equally distributed about the bias voltage (+V) during the interval when the sync pulse causes their conduction, the average currents of differential transistors 60 and 70 for the interval are equal. If the sawtooth is positive transistor 60 conducts more heavily. Conversely, if the sawtooth is negative transistor 70 conducts more heavily.

Because the relative currents in transistors 60 and 70 are determined by the voltage at base 62 contributed by the sawtooth waveform, during the sync pulse interval the phase relationship between sync and the horizontal oscillator is detected by the presence and direction of an offset. For example, if the oscillator is properly phased with respect to the reference sync pulse the portion of the sawtooth waveform present at base 62 when the reference sync pulse turns on transistors 60 and 70 will be zero due to the AC coupling of capacitor 33 and no change in the relative conductions of transistors 60 and 70 will be produced. If the oscillator is running slightly slow the phase of the sawtooth will lag the sync pulse making the voltage at base 62 positive when the differential amplifier is turned on and transistor 60 will conduct more than 70. If the oscillator is running fast the sawtooth will lead the sync making base 62 negative and causing the conduction of transistor 70 to increase relative to transistor 60.

The collector current of transistor 60 is carried by diode 84 while the collector current of transistor 70 is the algebraic sum of the collector current of PNP transistor 80 and APC filter (29) current. Diode 84 and transistor 80 form a current "mirror" circuit in which equal currents are carried by the diode and transistor. Since diode 84 will under all conditions carry the same current as transistor 60 and that same current will be carried by transistor 80 due to the current mirror changes in relative conduction between transistors 60 and 70 will cause an additional current to flow into or out of hold capacitors 85 and 86.

If the receiver is properly synchronized, the conductions of transistors 60 and 70 are equal and no current flows into or out of the hold capacitors. If the horizontal oscillator leads the reference sync pulses, the conductions of transistors 60 and 80 and diode 84 are reduced and current is drawn from hold capacitors 85 and 86 by transistor 70. The resulting discharge of hold capacitors 85 and 86 lowers the error voltage coupled through buffer amplifier 28 to horizontal oscillator 25. This lower voltage in turn causes a decrease of oscillator frequency. The error voltage is then maintained on hold capacitors 85 and 86 until the next horizontal sync pulse causes another "sampling" cycle in which the phase detector is again turned on and the base voltage of transistor 60 again determines whether additional charge is drawn from or contributed to hold capacitors 86 and 85. The successive "sample and hold" cycles continue until the circuit again achieves synchronization between the reference sync pulses and the sawtooth sample of the horizontal oscillator output (evidenced by a zero sawtooth contribution at base 62).

Because the differential amplifier phase detector is nonconductive, the voltage on hold capacitors 86 and 85 remains constant between sync pulses and the system functions as a sample-and-hold circuit in which periodic samplings of the correctness of system relationship occur between which the system remains steady at the last derived value.

Of course, if the oscillator 25 lags the reference sync pulses, base 62 is positive causing an increase in the conduction of transistors 60, diode 84 cannot be carried by transistor 70 (since its conduction is reduced) and hold capacitors 85 and 86 are charged raising the stored error voltage. The increased error voltage applied through buffer amplifier 28 to horizontal oscillator 25 causes an increased oscillator frequency. Again the process is repeated until synchronism is restored. As can be seen from the above discussion, the ability of phase detector 30 to change the error voltage is determined by its ability to charge or discharge hold capacitors 85 and 86 which in turn is controlled by the conductions of transistors 60 and 70.

The action of speed control amplifier 31, which controls the response speed of the horizontal APC system, is best described by initially considering a weak signal condition. When the voltage produced by AGC 17 acts to increase the gain of IF amplifier 12 and tuner 11 the threshold established by reference 34 is overcome and the positive voltage applied to base 42 of transistor 40 is reduced. The reduced voltage on base 42 causes a corresponding reduction of the amplitude of the collector current of transistor 40 causing reduced currents in transistors 60 and 70 and the APC system response speed, which varies directly with the conduction of transistors 60 and 70, is correspondingly reduced. With reduced speed of APC response the system is properly configured to reject the noise inherent in weak signal reception. Conversely, when a strong signal is received (for example, from a video player) the conduction of transistors 40, 60 and 70 is increased by speed control amplifier 31 and the speed of APC system response is increased.

While the above descriptions of APC response speed variation have been individually directed to strong and weak signal receptions, it should be noted that the system responds in an analog fashion rather than in distinct modes. The variation of AGC error voltage is a continuous function of signal strength within a predetermined range. Correspondingly, the APC system response speed is continuously varied by the speed control amplifier. Under all conditions of signal strength within a predetermined range, the APC response speed is maintained optimumly for synchronization of horizontal oscillator.

It should also be noted that the described embodiment shows a variation of the reference sync pulse applied to the differential transistor pair within the phase detector. This is believed more advantageous than reduction of the amplitude of sawtooth signal applied. It should be clear, however, that the phase detector output is a function of both inputs and variation of either the sawtooth or sync pulse inputs will affect variation of system response speed.

What has been shown is a novel horizontal APC system in which the speed of system response is augmented by the AGC voltage and varies as a function of signal strength. The system, therefore, provides wide band, fast action APC response under strong signal conditions and progressively narrower band slower system speed of response during weaker signal higher noise conditions.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a television receiver including signal means recovering picture, audio and scansion synchronizing information from a received signal; display means; automatic gain control means maintaining the recovered picture information at a substantially constant level, horizontal and vertical scansion means developing a raster on said display means and horizontal scansion synchronization means synchronizing the horizontal scansion of said display with said synchronizing information, the improvement comprising:
   control means producing analog variation of the system response speed of said horizontal scansion synchronization means directly with the amplitude of said received signal.

2. A television receiver as set forth in claim 1, wherein said control means are responsive to said automatic gain control means.

3. A television receiver as set forth in claim 2, wherein said horizontal scansion synchronizing means include an oscillator and an automatic phase control operative thereon and wherein said control means vary the response speed of said automatic phase control.

4. A television receiver as set forth in claim 3, wherein said automatic phase control includes a phase discriminator comparing said synchronizing information and the output of said oscillator and producing a corresponding error signal and wherein said control means vary the error signal generating capacility of said phase discriminator.

5. A television receiver as set forth in claim 4, wherein said control means vary the error signal generating capability of said phase discriminator by changing the amplitude of said scansion synchronizing information applied to said phase discriminator.

6. In a television receiver including signal means recovering picture, audio and scansion synchronizing information from a received signal; display means; automatic gain control means maintaining the recovered picture information at a substantially constant level, horizontal and vertical scansion means developing a raster on said display means and horizontal scansion synchronization means, including a local oscillator and phase discriminator, synchronizing the horizontal scansion of said display with said synchronizing information, the improvement comprising:
   control means varying the system response speed of said horizontal scansion synchronization means directly with the amplitude of said received signal by varying the error signal generating capability of said phase discriminator in response to said automatic gain control means.

* * * * *